United States Patent [19]

Bailey et al.

[11] 4,200,619

[45] Apr. 29, 1980

[54] PROCESS FOR PURGING SODIUM SULFATE FROM A SULFUR DIOXIDE REMOVAL SYSTEM

[75] Inventors: Edgar E. Bailey, Lakeland, Fla.; Norman E. Nicholson, Stockton-on-Tees, England; John Scarlett, Kirk Merrington, England; John F. Flintoff, Middlesbrough, England

[73] Assignee: Davy Powergas, Inc., Lakeland, Fla.

[21] Appl. No.: 866,227

[22] Filed: Jan. 3, 1978

Related U.S. Application Data

[63] Continuation of Ser. No. 647,516, Jan. 8, 1976, abandoned.

[51] Int. Cl.$^2$ .................. C01B 17/00; C01D 5/00; C01B 17/45
[52] U.S. Cl. .................................. 423/242; 423/551; 423/512 A
[58] Field of Search .............. 423/242, 244, 551, 553, 423/512 A

[56] References Cited

U.S. PATENT DOCUMENTS

| | | | |
|---|---|---|---|
| 2,459,302 | 1/1949 | Aronson | 423/553 |
| 2,504,097 | 4/1950 | Wiseman et al. | 423/553 |
| 3,391,996 | 7/1968 | Van Dijk et al. | 423/320 |
| 3,954,955 | 5/1976 | Fukert | 423/242 |
| 3,971,844 | 7/1976 | Schneider | 423/242 X |

FOREIGN PATENT DOCUMENTS 4643964 7/1973 Japan .

Primary Examiner—O. R. Vertiz
Assistant Examiner—Gregory A. Heller
Attorney, Agent, or Firm—Bernard & Brown

[57] ABSTRACT

Sodium sulfate is purged from a sulfur dioxide removal system involving contact of a sulfur dioxide-containing gas with a solution containing sodium sulfite to absorb sulfur dioxide from the gas. The spent absorbing solution is regenerated by desorbing sulfur dioxide and recycled for further use. To avoid an unduly large build-up of sulfate in the system, at least a portion of the absorbing-desorbing medium containing sodium sulfate and a relatively large amount of sodium bisulfite, e.g. spent absorbing solution, is contacted with a treating gas containing at least a small amount of sulfur dioxide while reducing the amount of water in the medium so that a slurry is obtained having up to about 10, or even up to about 20, weight percent precipitated solids containing sodium sulfate in greater concentration than would otherwise be obtained in the absorption-desorption cycle. Preferably, the sulfur dioxide-containing treating gas is unsaturated with respect to water. The insolubles containing sodium sulfate are removed from the liquid, and the liquid can be returned to the sulfur dioxide removal system. In one preferred aspect of the invention, up to about 75 weight percent of the entire stream of spent absorbing solution is treated to form up to about 10 weight percent undissolved solids which are relatively rich in sodium sulfate content. In the invention the sodium sulfate-containing solids can be separated from the liquid which is subjected to a desorption operation to produce sulfur dioxide, and the latter operation can be conducted while maintaining at least about 25 weight percent undissolved solids in the desorption zone.

13 Claims, 1 Drawing Figure

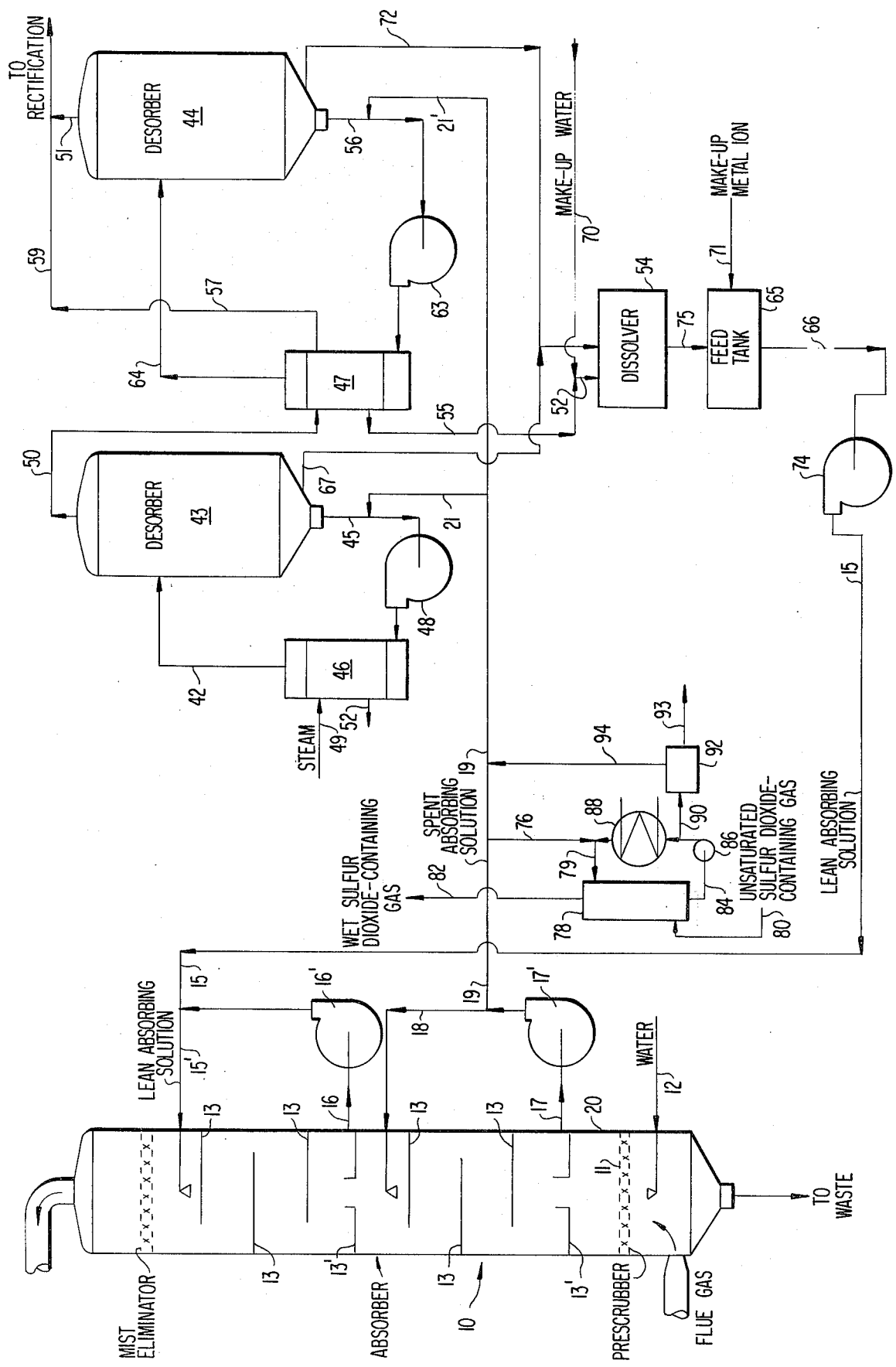

PROCESS FOR PURGING SODIUM SULFATE FROM A SULFUR DIOXIDE REMOVAL SYSTEM

This is a continuation, of application Ser. No. 647,516, filed Jan. 8, 1976 now abandoned.

This invention relates to the removal of sulfur dioxide from gas streams by contact with an aqueous sodium sulfite solution to absorb sulfur dioxide and provide a solution richer in sodium bisulfite which can be treated to desorb sulfur dioxide and regenerate the absorbing solution for reuse, and in which sodium sulfate is formed as a by-product in the absorption-desorption medium and must be purged from the system without undue loss of valuable sodium compounds. More particularly, the invention concerns a process for reducing the loss of desireable and valuable sodium compounds from the cyclic sulfur dioxide removal system by purging undesireable sodium sulfate from the absorbing-desorbtion medium as solids containing an increased amount of sodium sulfate.

Sulfur dioxide is a recognized pollutant of the atmosphere and is produced by oxidation of sulfur or sulfur-bearing materials. Sulfur dioxide is found in significant amounts as a constituent of various waste gases such as smelter gases, off-gases from chemical plants, and stack or furnace gases from coal or oil-burning furnaces such as are used in electric power plants. Although the concentration of sulfur dioxide in such gases is generally minor, e.g., from about 0.001 up to about 5 mole percent, and is frequently less than about 0.5 mole percent (less than about 1% by weight), the emission of sulfur-dioxide may be substantial, particularly in industrial applications due to the large amount of sulfur-bearing material being processed. For instance, a modern electric plant having a 1,350,000 kw. capacity will burn up to about 15,000 tons of coal per day. Despite the fact that the concentration of sulfur dioxide in the stack gases from the electric plant can be low, e.g., of the order of 0.2 to 0.3 mole percent, the total sulfur dioxide produced may be in the neighborhood of 1,000 tons per day. Similarly, significant amounts of sulfur dioxide are produced in utilization of other fuels which may bear sulfur.

The removal of sulfur dioxide from sulfur dioxide-containing gases may be effected by treatment with an aqueous sodium sulfite solution. The operation of an efficient and economical system for removal of sulfur dioxide will be characterized not only by the efficiency of absorption of sulfur dioxide from the sulfur dioxide-containing gases, the efficiency of desorption of sulfur dioxide from the spent absorbing solution, and the purity of the sulfur dioxide product, but also by the minimization of loss of metal values. Sulfur dioxide-containing gas obtained, for instance, by burning sulfur-bearing mineral products and the like as fuels, can be contacted with sodium sulfite in an aqueous solution to form bisulfite, and thereby substantially reduce the sulfur dioxide content of the gas to, for instance, less than about 0.02 mole percent when the sulfur dioxide-containing gas comprises more than about 0.2 mole percent sulfur dioxide. The removal of sulfur dioxide from the gases is often up to about 95 percent or more. The spent absorbing solution can be heated to convert the bisulfite to sulfite and sulfur dioxide, and to generate a liquid or liquid-solid material which serves as the source of the absorbing solution. The sulfur dioxide can be drawn-off and cooled or compressed to provide a liquid product or sent as a gas to a sulfuric acid plant or sulfur plant. Regenerated absorbing solution can be recycled to the absorption zone. For additional information and further exemplification regarding sulfur dioxide removal systems which can advantageously employ the technology disclosed herein, see U.S. Pat. Nos. 3,607,037, 3,653,812, and 3,790,660, all of which are incorporated herein by reference.

The sulfur dioxide-containing gases to be treated usually contain materials such as sulfur trioxide, oxygen, elemental iron, and the like, and, particularly when the gases containing sulfur dioxide are derived from the combustion of fuel, other materials which may be present include oxides of nitrogen. At least some of these materials promote the oxidation of the sodium sulfite or bisulfite to sulfate. Sodium sulfate is an inert material for purposes of the suflur dioxide absorption-desorption process, because sulfate cannot be regenerated to sulfite during the desorbing operation. Sulfate build-up therefore occurs in the sulfur dioxide absorption-desorption system. A portion of the absorbing-desorbing medium can be purged from the system to prevent unduly large amounts of inert sulfate from accumulating in the system. This purge may be a portion of the spent absorption solution or material obtained in the desorption of the sulfur dioxide from the spent absorbing solution. These purge materials, however, contain substantial amounts of sulfite or bisulfite, along with the sulfate, and when the purge is discarded, an undue expense may occur due to the accompanying loss of useable sodium values from the system which must be replaced by the addition of a suitable soluble sodium compound.

It has been proposed to purge sulfate from the absorption-desorption system more selectively with respect to sulfite or bisulfite values, and return the latter to the absorbing-desorbing system. Simple separation of sodium sulfate from sulfite and bisulfite in the spent absorbing solution by low temperature crystallization gives a sulfate-crystallization product containing minor amounts of sodium sulfite. A more selective separation of sulfate is thereby obtained but such processing involves undue expense because of the cooling requirements needed to reach the low crystallization temperatures and the necessity to reheat the crystallization mother liquor returned to the absorption-desorption system. Also the crystals obtained are in the hydrate form, and drying is required to facilitate handling if the product is to be further processed or sold. Large drying facilities are, therefore, necessary to reduce not only the free water content but also the water of hydration of the material.

In another system for concentrating sodium sulfate so that it can be more economically separated from the sulfur dioxide removal system described above, a purge stream of spent absorbing solution is contacted with a gas containing sulfur dioxide to convert at least a portion of the sodium sulfite to the more soluble bisulfite. The stream is then cooled to crystallizing temperature and sodium sulfate precipitates more selectively. This procedure has disadvantages in that two separate treatments of the purge stream are required, i.e., sulfur dioxide contact followed by crystallization at a reduced temperature of, say, about 0° to 10° C., which is a considerable expense. The additional sodium bisulfite, formed in the treatment of the purge stream with sulfur dioxide, and contained in the resulting separated liquid stream added to the absorption-desorption cycle, leads to an additional heat requirement to convert the bisulfite to sulfite with the formation of sulfur dioxide. Moreover, in this operation the sodium sulfate contains sodium sulfate hydrates which, as noted above, may necessitate the provision of relatively large drying facilities if the product is to be further handled or sold.

In British Pat. No. 489,745 there is described a sulfur dioxide removal system which, although devoted mainly to the use of an aqueous ammonium sulfite absorbing medium, mentions the possible use of alkali metal sulfites, and the system is designed to purge sulfate. In the operation the spent absorption medium is desorbed of sulfur dioxide without precipitation of salts. The resulting solution is substantially saturated with sulfate and relatively unsaturated with respect to sulfite and bisulfite. The removal of water and cooling of the solution, say from 110° to 50°–70° C. results in the precipitation of sulfate. This type of operation is undesirable since the system is apparently dependent upon the liquid from the sulfur dioxide desorption zone being relatively unsaturated with respect to sulfite which means that a large amount of absorption solution must be supplied for the removal of a given amount of sulfur dioxide.

In accordance with the invention disclosed in application Ser. No. 630,503, filed Nov. 10, 1975, in the names of Norman E. Nicholson, John Scarlett, and John F. Flintoff, there has been devised a highly advantageous procedure for reducing the amount of sodium sulfate in sodium sulfite-bisulfite, absorption-desorption systems for removing sulfur dioxide from gaseous streams. In the process it is not necessary to reach temperatures substantially below ambient, and the sodium sulfate removed can be in an essentially non-hydrated or anhydrous form. Accordingly, at least a portion of the aqueous sodium sulfite-bisulfite, absorbing-desorbing medium containing a relatively large quantity of sodium bisulfite is treated to remove water and thereby precipitate a limited amount of sodium sulfate-containing solids from the solution which solids have a higher sulfate concentration on a dry basis than the absorption-desorption medium from which they are formed. This treatment is continued for a sufficient length of time to ensure substantial precipitation of sodium sulfate, but is concluded before the medium contains more than about 10 weight percent of precipitated solids. The material preferably treated in accordance with the process is essentially spent absorption medium. In performing the process, the removal of water and precipitation of solids may be effected without substantial conversion of bisulfite to sulfite and sulfur dioxide, e.g., there may be less than about 10 weight percent of the bisulfite so converted. The precipitated solids containing sodium sulfate can be readily removed from the resulting slurry by the use of conventional liquid-solid separation equipment to provide, at least initially, an essentially non-hydrated sulfate product which is relatively high in sodium sulfate content, advantageously at least about 50 weight percent, on a dry basis. The separated solids may contain a major amount of sodium sulfate, and a minor amount, if any, of sodium sulfite, preferably these amounts are at least about 70 weight percent sodium sulfate and less than about 30 weight percent sodium sulfite based on the total of these materials. The concentration of sodium sulfate in the precipitated solids is often at least about 2 times, on a dry basis, the concentration of sodium sulfate in the absorption-desorption medium from which the solids are formed by the evaporation of water.

In accordance with the method of the present invention, a process of the general type described in said application Ser. No. 630,503 is performed in an advantageous manner. Accordingly, the separation of sodium sulfate-containing solids by the removal of water is conducted by contact of the absorbing-desorbing medium with a sulfur dioxide-containing gas which is preferably unsaturated with respect to water, while dehydrating said medium and precipitating solids containing a significantly greater concentration of sodium sulfate, on a dry basis, than is in the absorbing-desorbing medium treated. Due to the presence of sulfur dioxide in the treating gas the ratio of bisulfite to sulfite in the medium undergoing treatment is in essence maintained and may be increased. Thus during the removal of water the production of the more insoluble sodium sulfite from sodium bisulfite is not substantial, and separation of solids having a greater concentration of sodium sulfate can be facilitated. Due to the charging of sulfur dioxide to the water removal operation the solids precipitated may have a greater concentration of sulfate than would be obtained under similar conditions and with the same amount of precipitate, but in the absence of added sulfur dioxide. Although the amount of solids precipitated may preferably be up to about 10 weight percent of the material subjected to water removal, this amount may be greater, say up to about 20 weight percent, and operations with about 10 to 20 percent precipitation may be advantageous in some instances.

In the method of the present invention the aqueous absorbing-desorbing solution which undergoes water removal and sulfate precipitation for purging, contains a major weight amount of sodium bisulfite, a minor amount of sodium sulfate, and none or a minor amount of sodium sulfite, based on the total of these components. The solution may preferably contain this amount of bisulfite at the beginning of water removal or it may attain this concentration in the liquid phase during the removal of water. Most preferably, the material treated is spent absorbing solution derived from the absorption side of the system for removing sulfur dioxide from gas streams. If the material treated is, for example, a portion of the lean absorption solution employed to absorb sulfur dioxide in the absorption-desorption system, it may be necessary to consume sulfur dioxide in order for the stream to have the herein stated bisulfite to sulfite ratios and to result in the precipitation of solids having the desired concentration of sodium sulfate. The material which is treated may contain at least about 25 weight percent of total salts, preferably at least about 30 weight percent, and often this amount may not exceed about 50 weight percent. The sodium sulfate content of this stream may usually not exceed about 10 weight percent, and preferably this amount may often not be above about 8 weight percent. The sodium sulfate content is generally at least about 1 weight percent, and preferably is about 3 to 7 weight percent. The weight ratio of sodium sulfate to sodium sulfite in the solution treated for limited precipitation of solids usually is, or becomes during the treatment, at least about 0.7:1, preferably at least about 1:1. Although in general the higher the sulfate content in the material treated the purer the sodium sulfate obtained by the method of this invention, an increase in the amount of inert sodium sulfate material circulating in the absorption-desorption system has a detracting factor since there may be less active sodium present for a given amount of water in the system. As a result a greater quantity of circulating material would be required to provide a given sulfur dioxide absorption-desorption capacity. Often the absorbing medium treated has about 0.1 to 10 weight percent sodium sulfite and about 15 to 40 weight percent sodium bisulfite, based on the total of these components and the sodium sulfate and water present. The stream may contain minor amounts of other materials, e.g., sodium thiosulfate.

The solution which undergoes water removal for sodium sulfate precipitation and purging generally contains, initially or during the treatment, a mole ratio of sodium bisulfite to sodium sulfite of at least about 2:1, often at least about 3:1. The amount of sodium bisulfite in the material undergoing treatment as compared to the total active metal in the material may be alternatively expressed in terms of "s/c" which is defined as the number of moles of active sulfur, e.g., $SO_3^=$ and $HSO_3^-$, per 100 moles of water divided by the moles of active sodium per 100 moles of water. Thus, a pure sodium bisulfite solution would have an s/c of 1, and a pure sodium sulfite solution would have an s/c of 0.5. Sodium sulfate, for instance, does not provide active sulfur or active base. The s/c of the material treated in accordance with the process of this invention is preferably about 0.85 to 0.97.

In the present invention sodium sulfate is removed from the system by treating at least a portion of the aqueous absorption-desorption medium, preferably spent absorption solution, to evaporate a sufficient amount of water and precipitate a significant, but limited, amount of solids in the solution. Thus the evaporation of water is conducted in a manner to have up to about 10 or 20 weight percent crystals in the absorption-desorption medium as described above, often at least about 1 weight percent, and preferably up to about 5 weight percent. The operation is advantageously conducted at somewhat elevated temperatures which are sufficient to precipitate essentially non-hydrated crystals without excessive water removal. Generally, such temperatures are at least about 37° to 38° C., and to be more certain of having temperatures sufficient to form a non-hydrated product when it is precipitated, a temperature of at least about 40° C. is generally recommended. Suitable temperatures for accomplishing the desired evaporation of water thus include about 40° to 110° C. Preferably the temperature is about 40° to 70° C. The choice of temperature may depend on the pressure employed, and the pressure may be ambient, reduced or elevated. Advantageously, the pressure is about 10 to 20 psia, and preferably, essentially atmospheric pressure is used.

In the method of the present invention it is not necessary that the sulfur dioxide-containing gas with which the sodium sulfate-containing material is initially contacted to perform the simultaneous dehydration and precipitation of sulfate-containing solids, have more than a minimal sulfur dioxide. Since the gas contains sulfur dioxide, the ratio of bisulfite to sulfite in the liquid undergoing treatment is maintained or increased, and preferably the sulfur dioxide partial pressure in the gas phase over the liquid undergoing dehydration is equal to or greater than that in the liquid phase. Suitable gases thus include the dilute gas feed streams treated in the absorption-desorption cycle. Thus, the gas may have a sulfur dioxide concentration of, say, at least about 0.05 mole percent. Generally, the sulfur dioxide concentration of the gas is minor, e.g. at least about 0.1 mole percent, and often may be up to about 1 mole percent. Preferred concentrations are in the range of about 0.1 to 0.5 mole percent. The other constituents of the gas are preferably essentially inert under the conditions of the treatment of this invention, and may include, for example, nitrogen and oxygen. The sulfur dioxide-containing gas passed into contact with the stream undergoing treatment is preferably less than saturated with moisture at the conditions of the treatment in order that the dehydration will occur more readily. Generally, this gas will before use in accordance with the process of this invention, have a moisture content not exceeding about 70 weight percent of saturation, and preferably does not exceed about 50 weight percent of saturation. The conditions of the contact of the material with the sulfur dioxide-containing gas in terms of, for instance, time of contact temperature, and moisture content of the gas are such that the desired amount of water will be removed from the purge stream.

In the method of this invention, the water content of the material which is treated with the sulfur dioxide-containing gas may be reduced by up to about 75 or more weight percent based on the total weight of water charged to the operation, preferably, at least about 10 weight percent. The material undergoing this treatment remains sufficiently fluid to be readily pumpable. Although contact of the material with the sulfur dioxide-containing gas may be on a once-through basis, it is quite desirable to recycle the mixed liquid and solid phases through a contacting tower as described below in connection with the accompanying drawing.

The slurry obtained in the water removal operation is subjected to liquid-solid separation to provide a separate solid phase which is relatively high in sulfate content. The separation may be done without reducing the temperature of the slurry, and the temperature may generally be about 40° to 110° C., preferably about 40° to 70° C. The separated liquid phase or mother liquor can be charged to the absorption-desorption system, and preferably to its desorption zone. The separated solids may, if desired, be dried and they may undergo self-drying upon standing by the free water being taken up as water of hydration. The separated solids advantageously contain a major amount of sodium sulfate, say at least about 65 weight percent, preferably at least about 75 weight percent, on a dry basis. Other crystals present may be composed primarily of sodium sulfite.

The amount of solids formed in the water evaporation stage of the process of this invention, and subsequently removed, is sufficient to prevent undue build-up of sodium sulfate in the absorption-desorption system. The amount of sulfate purged is preferably substantially equal to the amount of sulfate being formed in the absorption-desorption system. Also, the amount of solids formation required may depend on the purity of the sulfate in the precipitated and separated solid phase, as well as the amount of the total absorption-desorption medium which is subjected to the sulfate removal operation. Thus, up to the entire stream of absorption-desorption medium may be treated for sulfate removal in which case the percentage of solids formed may be less than if only a portion of the medium is subjected to the sulfate precipitation treatment. Generally, as the percentage of solids formed in the medium decreases the purity of the precipitated sulfate increases.

In one embodiment of the invention substantially the entire absorption-desorption medium is processed for water removal and sulfate precipitation. Alternatively, only a portion of this medium may be so treated, and in such case frequently about 10 to 90 weight percent of the total medium is treated in this manner, more often up to about 75 weight percent, say about 20 to 75 weight percent. Preferably, this amount is sufficient so that a maximum of about 5 weight percent solids need be precipitated to have an adequate purge of sodium sulfate. The liquid medium or mother liquor separated in the sulfate removal procedure is usually passed to the sulfur dioxide desorption stage since the liquid is high in bisulfite content. Depending on the amount of the mother liquor to be recycled it may be desirable to charge it to some other part of the absorption-desorption system. Make-up sodium values in the form of suitable water-soluble, sodium compounds such as sodium carbonates or hydroxide, may be added to the system of this invention to replace sodium loss, including that removed in the sodium sulfate solids which are precipitated. Advantageously, this addition is to the lean absorbing solution to which make-up water may also be added.

In the sulfur dioxide desorption stage of the method of this invention the spent absorption medium is subjected to elevated temperatures to convert sodium bisulfite into sodium sulfite with the concomitant formation of a vapor phase containing sulfur dioxide and water. Suitable temperatures for this operation include about 40° to 110° C., preferably about 60° to 95° C. The pressure may be about 3 to 21 psia, preferably about 8 to 15 psia. The vapor phase can be treated for the recovery of purer sulfur dioxide, the manufacture of sulfur, or used, treated or disposed of in any other suitable manner. Various procedures for sulfur dioxide desorption can be used and a number are known in the art. It is preferred, however, that the desorption be accomplished with the simultaneous formation of an undissolved solids or crystal phase which enables the desorption to be accomplished with the use of lesser amounts of heat. In such operations the amount of undissolved solids in the desorption zone is generally at least about 15 weight percent of the slurry undergoing decomposition or sulfur dioxide desorption. As described in U.S. Pat. No. 3,790,660 the amount of such solids is advantageously at least about 25 weight percent in order to alleviate difficulties of tube fouling, particularly when supplying heat to the desorption zone by passing the slurry through the tubes of an indirect heat exchanger. Preferably, the amount of undissolved solids is about 30 to 50 weight percent of the slurry undergoing decomposition. Also when the amount of undissolved solids is sufficiently high, the sodium sulfite content of the slurry may be adequate for a portion of the total slurry to be combined with water to dissolve the solids, and the resulting solution can be used as the lean solution for absorbing sulfur dioxide from the gas being treated in the absorption zone of the absorption-desorption system. The lean absorbing solution is usually composed to a major weight extent of sodium sulfite and minor weight amounts of sodium bisulfite and sodium sulfate based on the total amount of these salts present. Often the lean absorbing solution has about 10 to 35 weight percent sodium sulfite, about 3 to 15 weight percent sodium bisulfite, and about 1 to 10 weight percent sodium sulfate based on these components and water present.

DESCRIPTION OF THE DRAWING

The present invention will be further described by reference to the drawing which is a schematic flow diagram of a process employing the present invention in an absorption-desorption system using sodium sulfite for the removal and recovery of sulfur dioxide from flue gas. Equipment such as valves, pumps, heat exchangers, surge tanks, and the like, which would be used in a commercial embodiment of the invention and in the operation of an absorption-desorption system, is not shown since it can be of conventional design and employed in accordance with practices well known in the art.

Referring to the drawing, sulfur dioxide-containing flue gas enters absorber vessel 10 near the bottom thereof. The flue gas passes upwardly through prescrubber zone 20 in vessel 10. Water or other aqueous liquid is passed co-currently with the flue gas to a bed of column packing 11, the water or other liquid being supplied through line 12. This prescrubbing with an aqueous liquid may serve to remove suspended solids such as fly-ash and the relatively high water-soluble components, for instance sulfur trioxide, hydrogen chloride and the like from the flue gases.

The prescrubbed gas next enters a main absorption zone in absorber 10 wherein it passes upwardly, through sieve trays 13, and through a descending flow of lean absorbing solution which is supplied to vessel 10 through lines 15 and 15'. The lean absorbing solution contains sodium sulfite as the essential sulfur dioxide-absorbing component. Absorber 10 may employ other types of liquid-gas contacting structures, such as packing, bubble caps, alternate ring and discs or the like. The lean absorbing solution in line 15' is often at a temperature of at least about 30° C., preferably at least about 40° C., up to about 110° C., preferably up to about 70° C. Flow rates of the aqueous absorbing solutions through the absorption zone can be adjusted according to the sulfur dioxide concentration in the gas being treated, and the concentration of the sodium sulfite in the solution, so that a major amount, e.g., up to about 95% or more, of the sulfur dioxide may be removed from the gas by reaction with the lean absorbing solution.

To provide for better absorption of the sulfur dioxide, the absorbing solution can be collected on gas-passing trays 13' located in the middle and at the bottom of the absorbing section of the absorber and a portion of the collected solution can be recycled to a higher point in the column. Thus, the liquid on upper tray 13' is recycled to the upper part of the absorber by way of line 16, pump 16' and line 15', while liquid from the lower tray 13' is recycled to the column at a point just below upper tray 13' via line 17, pump 17' and line 18. Spent absorbing solution is removed from line 18 through line 19. The spent absorbing solution generally contains a major amount of sodium bisulfite and minor amounts of sodium sulfite and sodium sulfate based on the total amount of these components present.

A purge stream containing sodium sulfate, as well as sodium sulfite and bisulfite in solution, is drawn from line 19 via line 76 and passed to dehydrator 78 by line 79 for treatment. A sulfur dioxide-containing gas stream which is unsaturated with respect to water, is passed via line 80 to the bottom of dehydrator 78. Dehydrator 78 promotes the contact of the purge stream with the gas to effect evaporation of water therefrom, causing precipitation of anhydrous sodium sulfate crystals. The dehydrator may be of any suitable construction, for instance, a bubble-cap tower, or sieve tray tower, and the column is capable of handling solid particle-containing liquids without difficulty. Also, the dehydrator may be situated in the lower part of the main absorption tower 10 since a gas of low sulfur dioxide content can be used to accomplish the treatment of the purge stream. The resulting "wet" gas, i.e., the gas containing absorbed water vapor, exiting from dehydrator 78 via line 82, may be passed to absorption column 10 for sulfur dioxide recovery.

The purge stream, after being contacted with the dry gas in dehydrator 78, exits via line 84 through pump 86 for recirculation to the top of the dehydrator. The recirculating stream is passed through temperature-regulating vessel 88. Vessel 88 serves to maintain the dehydrator at a beneficial temperature for crystallizing anhydrous sodium sulfate, e.g., above about 37.5° C., but not at such a high temperature that substantial sulfur dioxide is made by decomposition of bisulfite. Preferably, the temperature of the liquid in the dehydrator will be in the range of about 40° to 50° C. Depending on, for instance, the nature of the sulfur dioxide-containing gas used for evaporation of water from the purge stream, vessel 88 may serve to cool the recirculating stream or may heat the recirculating stream. For instance, if the sulfur dioxide-containing gas is derived from the waste gas stream of a sulfuric acid plant, the vessel 88 may serve to heat the recirculating stream to maintain the dehydrator within the desired temperature range. Also, the spent absorbing solution which exits from main absorber 10 via line 19 may be too cool or too warm, and the purge stream in line 76 may be combined with the appropriately warmed or cooled recirculating stream from vessel 88 to provide the desired operating temperature for the dehydrator.

A portion of the stream passing from dehydrator 78 to vessel 88 is withdrawn via line 90 and passed to crystal separator 92. Crystal separator 92 may be selected from conventional processing equipment for effecting separation of solids and liquids such as filters, including rotary filters, centrifuges, clarifiers and other sedimentation equipment. Crystals having a high concentration of sodium sulfate can be removed by line 93 and the liquid stream, having sulfate removed therefrom, can be returned via line 94 to line 19 for processing to desorb sulfur dioxide and regenerate the absorbing solution.

In the regeneration section of the system, which can be operated in various ways, e.g., the manner shown in U.S. Pat. No. 3,790,660, the solution in line 19 can be heated to near desorption temperature in heaters not shown. The heated solution is introduced through lines 21 and 21' into the recycle circuits of the respective desorbers 43 and 44. The conditions of temperature, pressure, and residence time in desorbers 43 and 44 are so maintained as to effect the desired decomposition of sodium bisulfite, evaporation of sulfur dioxide and water, and precipitation of sodium sulfite crystals.

Desorbing vessels 43 and 44 are arranged in multiple-stage effect relationship. Desorbing vessel 43 is operated at a higher temperature and pressure, and vessel 44 at a lower temperature and pressure. A recycle stream is heated in connection with each of the vessels 43 and 44, the heating being done in calandrias 46 and 47, respectively. In order to effect heating in vessel 43, the slurry in the vessel is withdrawn by line 45, combined with feed from line 21, sent through pump 48, through metallic tubes of calandria 46 and back to vessel 43 by way of line 42. Similarly, the slurry in vessel 44 is withdrawn by line 56, and after being combined with spent absorbing solution from line 21', it is sent by pump 63 through metallic tubes of calandria 47 and line 64 back to desorbing vessel 44.

Steam is introduced to calandria 46 through line 49 as the prime energy source for the desorption zone. Calandria 47, meanwhile, is heated by the sulfur dioxide and water-containing overhead vapors in line 50 coming from desorbing vessel 43. The condensate (water) from calandria 46 is withdrawn through line 52. In calandria 47, the indirect heat exchange contact effects condensation of a portion of the steam, but very little of the sulfur dioxide, in the overhead gases from desorbing vessel 43. The uncondensed vapors from calandria 47 are carried through line 57 to line 59. Line 57 typically carries vapor containing about 60 weight percent sulfur dioxide and the balance being essentially water vapor. Condensate is removed from calandria 47 via line 55 and is passed to line 52 and dissolver 54.

The overhead vapors from desorbing vessel 44 are removed from the vessel via line 51 and are combined in line 59 with the vapors leaving calandria 47. The vapor in line 51 typically contains about 5 to 10 weight percent sulfur dioxide, the balance being essentially water vapor. The combined vapors in line 59 can be sent to line 80 after drying, or to a rectification system (not shown) for recovering sulfur dioxide.

Slurry is withdrawn from desorber 43 via line 67 and from desorber 44 via line 72 and transported to dissolver 54. The slurry may contain about 40 to 50 percent of undissolved solids. Since water has been removed from the absorption solution during desorption, make up water, for example, from rectification (not shown), is supplied to tank 54 through line 70. The solution from dissolver tank 54 passes through line 75 to feed tank 65. Make-up sodium ion, which may be an aqueous sodium hydroxide solution, is added to feed tank 65 through line 71. The lean absorbing solution prepared in tank 65 is withdrawn through line 66 and is sent by pump 74 through line 15 to absorption zone 10 of the process.

The following examples will further illustrate the present invention, but do not limit it.

A sulfur dioxide absorption system which is essentially the same as in the drawing is employed to remove sulfur dioxide from flue gas from a 1,000 tons per day sulfuric acid plant. The flue gas is at a temperature of about 50° C. and contains approximately 0.25 mole percent sulfur dioxide, 0.005 mole percent sulfur trioxide, 5 to 7 mole percent oxygen, and the remaining nitrogen. The lean absorbing solution is at a temperature of about 60° C. and contains about 16.3 weight percent sodium sulfite, about 6.0 weight percent sodium bisulfite (calculated as the pyrosulfite, $Na_2S_2O_5$), about 4.7 weight percent sodium sulfate (17 weight percent on an anhydrous basis of the total weight of the sodium salts), and the balance essentially water. The gas exiting the absorption tower contains less than 0.05 mole percent sulfur dioxide. The purge in line 76, containing 2.4 weight percent sodium sulfite, 27.7 weight percent sodium bisulfite (calculated as pyrosulfite), and 4.9 weight percent sodium sulfate, at the rate of 55 liters per minute is combined with 4800 liters per minute of slurry from vessel 88. The combined stream is contacted in a countercurrent sieve plate dehydrator 78 with a dry, sulfur dioxide containing gas entering by way of line 80 at the rate of 21 moles per minute and at a temperature of about 48° to 50° C. The dry, sulfur dioxide-containing gas is withdrawn from a sulfuric acid plant before the $SO_2$ absorber and has the same approximate composition as the flue gas stated above. A stream containing about 4 weight percent of precipitated solids is continually removed at the rate of 4825 liters per minute from the bottom of the dehydrator and passed through vessel 88 and heated to maintain the temperature of the liquid in dehydrator 78 at about 40° C.

The overhead from the dehydrator contains slightly less sulfur dioxide on a mole per hour flow rate basis than the gas fed by line 80, and the overhead approaches saturation with water at the exit temperature, for instance, about 0.05 to 0.08 pounds of water per pound of dry gas. The solution or liquid phase undergoing dehydration maintains an s/c of slightly greater than the s/c of the feed, for instance, about 0.94 to 0.96 in this case, since some sulfur dioxide is absorbed into it. The crystalline precipitate formed in dehydrator 78 is composed of anhydrous crystals of sodium sulfate (about 75-80 or more weight percent sodium sulfate and the essential balance sodium sulfite). A portion of the stream withdrawn from the bottom of dehydrator 78 is passed to a rotary filter for removal of the sodium sulfate-containing solids at the rate of 1.6 kilograms per minute and at a temperature of 40° C., and the mother liquor is combined at the rate of 25 liters per minute with the spent absorbing solution for processing in the desorption portion of the process. Sodium hydroxide or carbonate may be employed as the make-up sodium ion to replenish sodium metal lost in the purge system. The savings in sodium metal values resulting from using the process of this invention can be appreciated when it is realized that without contact of the purge with sulfur dioxide, in an otherwise similar system, a substantially greater sodium metal loss may occur.

Tests were conducted on solutions which simulated the composition of spent absorber solutions obtained in an operation of the type shown in the drawing. In each case the solution was evaporated in a beaker at atmospheric pressure while essentially dry $SO_2$ was bubbled through the solution at approximately 100° C. until the stated solids content was obtained. The slurry was filtered through a hot buchner funnel and samples of the wet crystals and of the mother liquor were taken for analysis. The composition of the mother liquor and the composition of the crystals on a dry basis were thus determined. The results are in Table I.

TABLE I

| | Test No. | | 1 | 2 | 3 | 4 |
|---|---|---|---|---|---|---|
| SPENT ABSORBER SOLUTION ANALYSIS | $Na_2SO_3$ | % wt. | 5.7 | 5.7 | 5.7 | 5.7 |
| | $NaHSO_3$ (calc. as $Na_2S_2O_5$) | " | 21.0 | 21.0 | 21.0 | 21.0 |
| | $Na_2SO_4$ | " | 7.1 | 7.1 | 7.1 | 7.1 |
| | $Na_2S_2O_3$ | " | 0.3 | 0.3 | 0.3 | 0.3 |
| | $H_2O$ (by diff) | " | 65.9 | 65.9 | 65.9 | 65.9 |
| | Vol. taken | ccs | 761 | 760 | 762 | 760 |
| | Wt. taken | g | 998.2 | 997.1 | 999.8 | 996.5 |
| | Density | g/cc | 1.312 | 1.312 | 1.312 | 1.312 |
| CONDITIONS | $SO_2$ used | g | 76.2 | 43.1 | 82.5 | 135 |
| | Time | (min) | 35 | 25 | 40 | 105 |
| SOLIDS CONTENT OF SLURRY | | % wt. | 2.3 | 5.1 | 7.5 | 12.9 |
| MOTHER LIQUOR ANALYSIS | $Na_2SO_3$ | % wt. | 1.8 | 4.2 | 3.8 | 4.2 |
| | $NaHSO_3$ (calc. as $Na_2S_2O_5$) | " | 31.4 | 32.7 | 34.2 | 41.4 |
| | $Na_2SO_4$ | " | 7.2 | 6.1 | 4.8 | 2.8 |
| | $Na_2S_2O_3$ | " | 0.4 | 0.5 | 0.5 | 0.6 |
| | $H_2O$ (by diff) | " | 59.2 | 56.5 | 56.7 | 51.0 |
| CRYSTALS ANALYSIS* | $Na_2SO_3$ | % wt. | 6.5 | 8.1 | 5.6 | 5.6 |
| | $NaHSO_3$ (calc. as $Na_2S_2O_5$) | " | NIL | NIL | 9.7 | 13.1 |
| | $Na_2SO_4$ | " | 93.4 | 91.9 | 84.7 | 81.2 |
| | $Na_2S_2O_3$ | " | NIL | NIL | NIL | NIL |

*Calculated free of mother liquor and expected on a dry basis

The results in Table I show that crystals of greater than 80 or 90% sulfate content (on a dry basis) can be obtained from spent absorber solution by evaporation and treatment with sulfur dioxide. The sulfate content of the solids is substantially higher at a given percent of solids precipitated than would be the case if the evaporation were done without charging sulfur dioxide to the system.

Various modifications and equivalents of the process of this invention will be apparent to one skilled in the art, and may be made without departing from the spirit or scope of the invention.

It is claimed:

1. In a process for the removal of sulfur dioxide from gas in which sulfur dioxide is absorbed from the gas in an aqueous absorption solution of sodium sulfite to from the corresponding bisulfite, resulting bisulfite-containing absorption solution is desorbed to form sulfur dioxide and crystallize sodium sulfite from solution, and a sulfite-containing absorption solution is regenerated for recycling by dissolving crystallized sodium sulfite, and in which sodium sulfate is formed in the absorption-desorption medium, the improvement for removing sulfate from the system comprising contacting at a temperature of at least about 37° C., a portion of the aqueous absorption-desorption medium having in solution a major amount of sodium bisulfite, a minor amount of sodium sulfate, and a minor amount of sodium sulfite, based on the total weight of these components, with a sulfur dioxide-containing treating gas which is unsaturated with respect to water to remove sufficient water from the absorption-desorption medium to precipitate at a temperature of at least about 37° C., up to about 20 weight percent solids derived from the absorption-desorption medium, said solids having a major amount of sulfate and a minor amount of sulfite, without converting a substantial amount of bisulfite in solution to sulfite, separating sulfate and sulfite-containing precipitate and bisulfate-containing solution from resulting slurry, said precipitate having an increased amount of sodium sulfate based on the total weight of sodium sulfate, sodium sulfite and sodium bisulfite in said solids than in said absorption-desorption medium, removing sulfate and sulfite-containing precipitate as purge from the system, and passing said separated solution to the absorption-desorption cycle.

2. The process of claim 1 in which the absorption-desorption medium which undergoes said contact with treating gas is spent absorbing solution.

3. The process of claim 1 in which the desorption is conducted with a slurry containing dissolved bisulfite and sodium sulfite solids, said slurry containing at least about 25 weight percent of undissolved solids.

4. The process of claim 1 in which the temperature of said contact with treating gas is about 40° to 70° C.

5. The process of claim 4 in which the desorption is conducted with a slurry containing dissolved bisulfite and sodium sulfite solids, said slurry containing at least about 25 weight percent of undissolved solids.

6. A process of claim 1 in which said removal of water precipitates about 1 to 10 weight percent of solids derived from said absorption-desorption medium.

7. A process of claim 1 in which the absorption-desorption medium which undergoes said contact with treating gas is only a portion of the spent absorbing solution.

8. In a process for the removal of sulfur dioxide from gas in which sulfur dioxide is absorbed from the gas in an aqueous absorption solution of sodium sulfite to form the corresponding bisulfite, resulting bisulfite-containing absorption solution is desorbed to form sulfur dioxide and crystallize sodium sulfite from solution, and a sulfite-containing absorption solution is regenerated for recycling by dissolving crystallized sodium sulfite, and in which sodium sulfate is in the spent solution from said absorption, the improvement for removing sulfate from the system comprising contacting a portion of said spent solution containing in solution sodium bisulfite, about 1 to 10 weight percent of sodium sulfate and about 0.1 to 10 weight percent of sodium sulfite, said spent solution having a major amount of sodium bisulfite based on the total weight of these components, with a treating gas containing a minor amount of sulfur dioxide and which gas is unsaturated with water, to remove sufficient water from said spent solution at a temperature of about 40° to 70° C. to precipitate at such temperatures about 1 to 10 weight percent of solids derived from said spent solution, said solids containing a major amount of sodium sulfate and a minor amount of sodium sulfite, said major amount being at least about 2 times greater than the amount of sodium sulfate in said spent absorption solution on a dry basis, without converting a substantial amount of bisulfite in solution to sulfite, separating sulfate and sulfite-containing precipitate and bisulfite-containing solution from resulting slurry, removing sulfate and sulfite-containing precipitate as purge from the system and desorbing sulfur dioxide from said bisulfite-containing solution.

9. The process of claim 8 in which the spent absorbing solution has an s/c of about 0.85 to 0.97.

10. The process of claim 9 in which the desorption is conducted with a slurry containing dissolved bisulfite and sodium sulfite solids, said slurry containing at least about 25 weight percent of undissolved solids.

11. A process of claim 10 in which the absorption-desorption medium which undergoes said contact with treating gas is only a portion of the spent absorbing solution.

12. The process of claim 8 in which about 3 to 7 weight percent of solids which contain at least about 75 weight percent of sodium sulfate are precipitated from said spent solution by said water removal.

13. The process of claim 12 in which the sulfur dioxide-containing treating gas is at least about 50% unsaturated with respect to water.

* * * * *